(12) United States Patent
Jonsson et al.

(10) Patent No.: US 9,989,109 B2
(45) Date of Patent: Jun. 5, 2018

(54) METHOD FOR CALIBRATING A CLUTCH CONTROL ALGORITHM

(71) Applicant: VOLVO TRUCK CORPORATION, Göteborg (SE)

(72) Inventors: Johan Jonsson, Torslanda (SE); Edvard Lundgren, Göteborg (SE)

(73) Assignee: Volvo Truck Corporation, Göteborg (SE)

( * ) Notice: Subject to any disclaimer, the term of this patent is extended or adjusted under 35 U.S.C. 154(b) by 420 days.

(21) Appl. No.: 14/783,864

(22) PCT Filed: Apr. 29, 2013

(86) PCT No.: PCT/EP2013/001272
§ 371 (c)(1),
(2) Date: Oct. 11, 2015

(87) PCT Pub. No.: WO2014/177168
PCT Pub. Date: Nov. 6, 2014

(65) Prior Publication Data
US 2017/0299000 A1    Oct. 19, 2017

(51) Int. Cl.
*F16D 48/06* (2006.01)
*F16H 63/50* (2006.01)
*F16H 61/08* (2006.01)

(52) U.S. Cl.
CPC ......... *F16D 48/066* (2013.01); *F16H 63/502* (2013.01); *F16D 2500/1045* (2013.01); (Continued)

(58) Field of Classification Search
None
See application file for complete search history.

(56) References Cited

U.S. PATENT DOCUMENTS 5,411,124 A * 5/1995 Olson .................... F16D 48/06
192/103 R
5,737,979 A * 4/1998 McKenzie ............ F16H 61/061
74/731.1
(Continued)

FOREIGN PATENT DOCUMENTS

CN   101424337 A   5/2009
CN   102211577 A   10/2011
(Continued)

OTHER PUBLICATIONS

Chinese Official Action (dated Jun. 5, 2017) for corresponding Chinese App. 201380076111.4.
(Continued)

*Primary Examiner* — Dirk Wright
(74) *Attorney, Agent, or Firm* — WRB-IP LLP

(57) ABSTRACT

A method is provided for calibrating a control algorithm of a clutch control unit of a vehicle. The method includes requesting, clutch disengagement or engagement, monitoring clutch actuator position, determining a time interval that starts with the clutch disengagement or engagement request and ends when the clutch actuator has reached a predetermined position, and calibrating an estimated time interval of the control algorithm starting with clutch disengagement or engagement request and ending when the clutch actuator has reached a predetermined position based on the determined time interval. A computer program for implementing the method, as well as a vehicle comprising a clutch control unit calibrated according to the method, are also provided.

19 Claims, 4 Drawing Sheets

(52) U.S. Cl.
CPC .............. *F16D 2500/10412* (2013.01); *F16D 2500/30401* (2013.01); *F16D 2500/3166* (2013.01); *F16D 2500/5018* (2013.01); *F16D 2500/50251* (2013.01); *F16D 2500/7041* (2013.01); *F16H 61/08* (2013.01); *F16H 2342/04* (2013.01)

(56) References Cited

U.S. PATENT DOCUMENTS

| | | | |
|---|---|---|---|
| 6,050,379 A | 4/2000 | Lyon | |
| 6,213,916 B1* | 4/2001 | Ning | B60W 10/02 |
| | | | 477/174 |
| 6,309,325 B1* | 10/2001 | Baer | B60W 10/02 |
| | | | 477/166 |
| 8,041,486 B2 | 10/2011 | Baldet et al. | |
| 9,046,171 B2* | 6/2015 | Naqvi | F16H 61/08 |
| 9,416,874 B2* | 8/2016 | Vu | F16H 61/688 |

FOREIGN PATENT DOCUMENTS

| | | |
|---|---|---|
| EP | 1262360 A1 | 12/2002 |
| WO | 2010090196 A1 | 1/2010 |

OTHER PUBLICATIONS

International Search Report (dated Jan. 31, 2014) for corresponding International App. PCT/EP2013/001272.
International Preliminary Report on Patentability (dated Sep. 1, 2015) for corresponding International App. PCT/EP2013/001272.

\* cited by examiner

METHOD FOR CALIBRATING A CLUTCH CONTROL ALGORITHM

BACKGROUND AND SUMMARY

This disclosure relates to a method for calibrating a control algorithm of a clutch control unit of a vehicle. The disclosure also relates to a vehicle comprising a clutch and a clutch control unit, wherein the control algorithm of the clutch control unit is arranged to be calibrated. The disclosure is advantageous in the field of clutch control systems for all types of vehicles with automatic or semi-automatic transmission. The disclosure also relates to a computer program, a computer program product and a computer system.

A clutch is a mechanical device used to connect two rotating shafts. When the clutch is engaged, the shafts are locked to each other and torque can be transferred from one shaft to the other. When the clutch is disengaged, the shafts are completely decoupled and no torque is transferred between them.

Automatic and semi-automatic transmission generally comprises a mechanical clutch, a clutch actuating mechanism and a clutch control unit that controls the torque transmitting capacity of the clutch by means of the clutch actuating mechanism.

In vehicles, a clutch may be used to control the transfer of torque from the engine to the stepped gear transmission system. Before a gear shift, the clutch has to be disengaged, and after the gear shift reengaged. In order to retain the driving comfort during gear shift, e.g., to avoid jerking and unpleasant sounds from the engine, the clutch torque transmitting capacity has to be smoothly controlled during disengagement and engagement of the clutch. However, after aging and wear of components, the clutch may suffer from disturbances and may not react as when new.

A known concept for reducing such disturbances is to introduce a process for learning the clutch off point, as described in is described in WO 2010/090196. The clutch off point, also known as touch point, engagement point, slip point or kiss point, is the physical position at which the clutch engages/disengages, i.e. stops/starts to deliver torque from the engine to the transmission.

However, there are still room for improvements in clutch systems of vehicles with automatic or semi-automatic transmission in order to remove the above mentioned disturbances due to changes in clutch system characteristics as well as adapting clutch systems to the unique characteristics of each individual clutch unit.

It is desirable to provide a method for calibrating a control algorithm of a clutch control unit where the previously mentioned problem is at least partly avoided.

This disclosure concerns a method for calibrating a control algorithm of a clutch control unit of a vehicle, in order to adapt the timing of the clutch control unit to the speed of the clutch system. The method comprises:
  requesting clutch disengagement or engagement;
  monitoring clutch actuator position;
  determining a time interval that starts with said clutch disengagement or engagement request and ends when said clutch actuator has reached a predetermined position; and
  calibrating an estimated time interval of the control algorithm, which time interval starts with clutch disengagement or engagement request and ends when the clutch actuator has reached a predetermined position, based on said determined time interval.

Thus, the method first determines the actual time interval between the request and the clutch reaching the predetermined position. Secondly, the clutch control algorithm is calibrated with this time interval. Thus the control algorithm is adapted to the actual speed of the clutch system, which results in improved timing of the engagement and disengagement of the clutch. The timing of engagement and disengagement of the clutch is crucial in order to smoothly control the torque during a gear shifting process, and thus also crucial to the driving comfort in connection to gear shifting.

The speed of a specific clutch system depends on the characteristics of the individual components in the system, such as springs, cylinders, control valve and compressed air pressure. Even apparently identical clutch systems from the same manufacturer tend to differ slightly from each other since no individual component is exactly identical to another, for example due to manufacturing variations. Furthermore, the actuation speed of a clutch changes during its lifetime as the components age and wear.

In a vehicle with a manual transmission system, the experienced driver adapts to the present characteristics of the clutch system and adjusts the clutch movements accordingly in order to achieve proper timing. But in a vehicle with an automatic or semi-automatic transmission, the clutch movement is automatic and has traditionally been based on fixed parameters. If the characteristics of the individual clutch system are not correctly reflected in the fixed parameters, the clutch movements will suffer from bad timing, resulting in poor driving comfort. Also an initially perfectly timed fixed parameter clutch system will eventually suffer from bad timing, as the characteristics of its components change due to ageing and wear. Thus, in order to achieve proper timing with an automatic clutch, there is an apparent need to adapt the clutch control algorithm to the actual characteristics of the clutch system.

The disclosure further concerns a corresponding computer program, a corresponding computer program product, a corresponding computer system for implementing the method, and a corresponding vehicle comprising a clutch and a clutch control unit.

The time interval determined with this method is defined to end when the clutch actuator has reached a predetermined position. This predetermined position of the clutch actuator may preferably correspond to a predetermined clutch torque transmission capacity. Even more preferably, said predetermined position may correspond to a position where the clutch torque transmission capacity becomes substantially zero during clutch disengagement, i.e. the clutch disengagement point. The clutch disengagement point is of specific interest in clutch control, and thus it is especially useful to know the time it takes to reach it when a request has been made.

The time interval may advantageously be determined at vehicle standstill in order to eliminate potential disturbance sources that may occur during driving, but the time interval may also be determined during driving of the vehicle.

A plurality of determined time intervals may be collected, followed by calculating an average time interval based on the plurality of determined time intervals, and calibrating the clutch control unit based on the calculated average time interval. Such an averaging procedure limits the measurement errors and uncertainties in the determination of the time interval Preferably, the monitored clutch disengagement or engagement is executed at its currently maximal possible speed, i.e. the clutch actuating mechanism should operate at its maximum speed. The speed of the clutch actuating mechanism obviously affects the determined time interval. Using maxis al possible speed fixes one of the variables that affect the length of said time interval, and the calibration of the clutch control unit is thus rendered easier.

The clutch actuator may be located at a completely engaged position at time of the clutch disengagement request, and at a predetermined disengaged position at time of the clutch engagement request. The completely engaged position, which may in a normally engaged clutch correspond to a position determined without any influence by the clutch actuator, is usually the starting position of the clutch actuator when a request for clutch disengagement is made. The predetermined disengaged position corresponds in a normally engaged clutch to a position determined by the clutch actuator, and is a position where the clutch exhibits zero torque transmission capacity but not necessarily as far as the clutch plate may travel as this over time would risk permanent deformation of the clutch springs. The predetermined disengaged position is usually the starting position of the clutch actuator when a request for clutch engagement is made. For this reason, the completely engaged position and the predetermined disengaged position of the clutch actuator constitute suitable starting points in determining the time interval used for calibrating the clutch control unit.

The clutch may be arranged between a propulsion unit and a gear box of the vehicle.

The vehicle may comprise an automated friction clutch arrangement having a friction clutch, a clutch actuating mechanism and a clutch control unit, wherein the clutch may be disengaged and engaged by the clutch actuating mechanism.

Further, the clutch actuating mechanism may be powered by pressurised air supplied from a pressurised air storage tank, and in such case the estimated time interval of the control algorithm may be calibrated based also on current gas pressure within the gas storage tank. Incorporating the gas pressure dependence of the clutch actuating mechanism in the clutch control algorithm would be advantageous since the gas pressure affects the speed of the clutch actuating mechanism. The clutch position is consequently a function of both the time elapsed since a clutch engagement/disengagement request and the current gas pressure.

The clutch actuating mechanism may alternatively be electrically powered, and in such case the estimated time interval of the control algorithm may be calibrated based also on current and/or voltage supplied to the clutch actuating mechanism. Incorporating the voltage dependence of the clutch actuating mechanism in the clutch control algorithm would be advantageous since the voltage affects the speed of the clutch actuating mechanism.

The estimated time interval of the control algorithm may be calibrated based also on current temperature of the clutch components and/or current ambient temperature of the vehicle and/or clutch actuating mechanism. Thermal expansion and other temperature dependent phenomena in the components may at et the speed of the clutch actuating mechanism and thus the time required to engage or disengage the clutch. Incorporating the temperature dependence of the clutch actuating mechanism in the clutch control algorithm would therefore be advantageous since the temperature affects the speed of the clutch actuating mechanism.

The clutch actuating mechanism may comprise a directional control valve. The directional control valve governs the clutch actuator, which in turn controls the position of the clutch.

The friction clutch may be passively engaged by spring pressure, i.e. a so called normally engaged clutch. Being passively engaged by spring pressure means that the clutch is engaged by the force from one or more springs unless the clutch actuator actively exerts a force in a direction opposite to the spring force in order to brine the clutch to a disengaged position. As soon as the clutch actuator force is released, the spring force will return the clutch to its engaged position.

The opposite construction—a clutch passively disengaged by spring pressure, i.e. a so called normally disengaged clutch—would also be feasible. This means that the clutch is disengaged by spring force unless the clutch actuator actively exerts a force in a direction opposite to the spring force in order to bring the clutch to an engaged position. As soon as the clutch actuator force is released, the spring force will return the clutch to its disengaged position The clutch actuator position may be determined by means of a position sensor. A measurement of the clutch actuator position gives an indirect measurement of the clutch position, as the clutch actuator and the clutch are mechanically interconnected.

BRIEF DESCRIPTION OF DRAWINGS

In the detailed description of the disclosure given below reference is made to the following figure, in which.

DETAILED DESCRIPTION

Various aspects of the disclosure will hereinafter be described in conjunction with the appended drawings to illustrate and not to limit the disclosure, wherein like designations denote like elements, and variations of the aspects are not restricted to the specifically shown embodiment, but are applicable on other variations of the disclosure.

Figure 1:
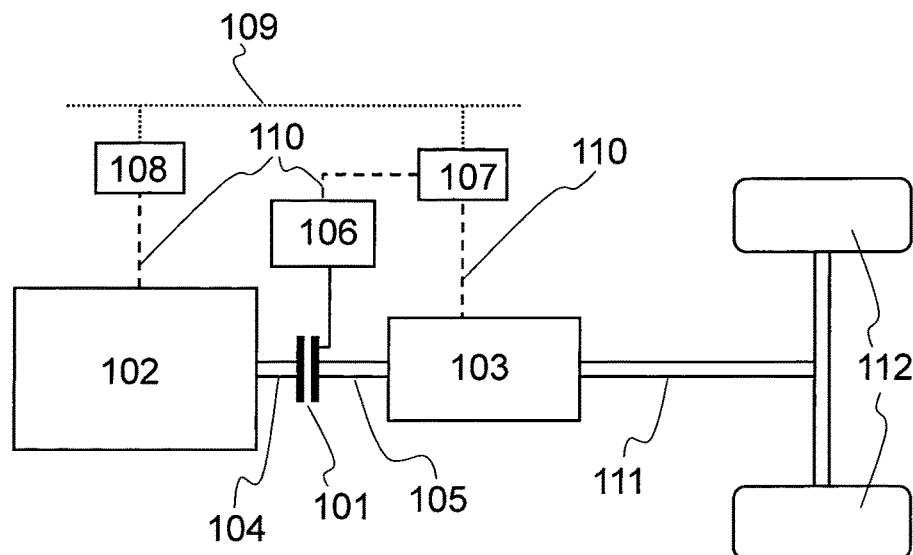
FIG. 1 shows a schematic overview of a drive train of a vehicle.

FIG. 1 shows a schematic overview of an example of a drive train in a vehicle. A clutch 101 is situated between the engine 102 and the gear box 103, connecting the crankshaft 104 of the engine 102 to the rotatable input shaft 105 of the transmission of the vehicle. An output shaft 111 connects the gearbox with the driving wheels 112 of the vehicle, When the clutch 101 is in an engaged position, it transfers torque between the shafts 104; 105, and when the clutch is in a disengaged position, the shafts 104; 105 are decoupled from each other and no torque is transferred between them. The position of the clutch 101 is set by a clutch actuator mechanism 104. The clutch actuator mechanism 104 is in turn controlled by a clutch control unit 107. An engine control unit 108 controls the engine 102. The two control units 107; 108 communicate with each other for example via a controller area network (CAN) bus 109. Alternatively, both the engine and gear box may be controlled by a single control unit. Further, the clutch control unit 107 is connected to the clutch actuator mechanism 106 and the gear box 103 and the engine control unit 108 is connected to the engine 102 via signal cables 110.

Figure 2:
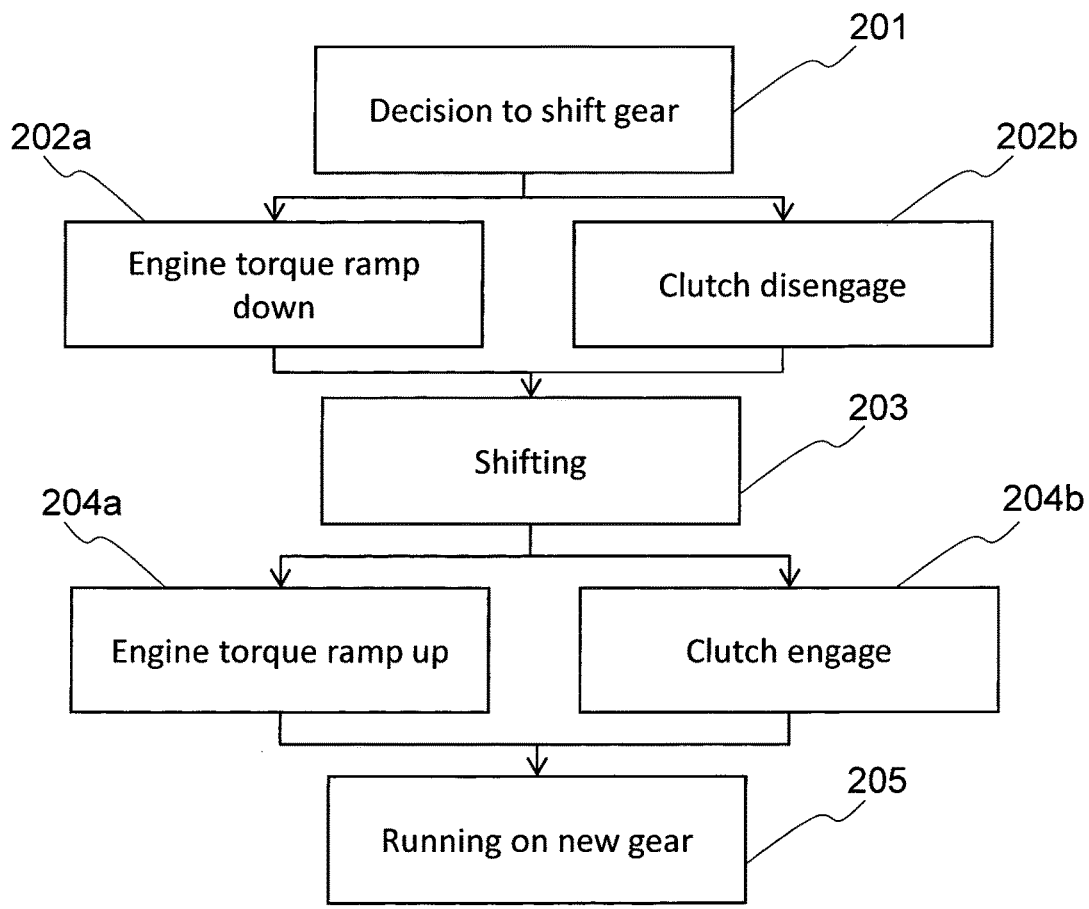
FIG. 2 shows a process map for a gear shift process.

FIG. 2 shows an exemplary process map for a gear shifting. The first step 201 comprises taking the decision to shift gear. This decision may be taken by the clutch control unit 107, the engine control unit 108 or another electronic control unit. A typical reason for shifting gear may be to adapt the engine speed to an increased or decreased vehicle speed, or to increase the torque to the wheels when driving up a hill. The second step 202a, 202b comprises the two simultaneous actions of ramping down the engine torque 202a and disengaging the clutch 202b. The ramp down of the engine torque 202a is controlled by the engine control unit 108, and the disengagement of the clutch is controlled by the clutch control unit 107. A precise timing of the ramp down of the engine torque and the disengagement of the clutch is required in order to retain the driving comfort. The third step 203 comprises shifting to a new gear. The fourth step 204, 204b comprises the two simultaneous actions of ramping up the engine torque 204a and engaging the clutch 204b. These actions are controlled by the engine control unit 108 and the clutch control unit 107, respectively. In the fifth step 205, the vehicle is running on the new gear.

Figure 3:
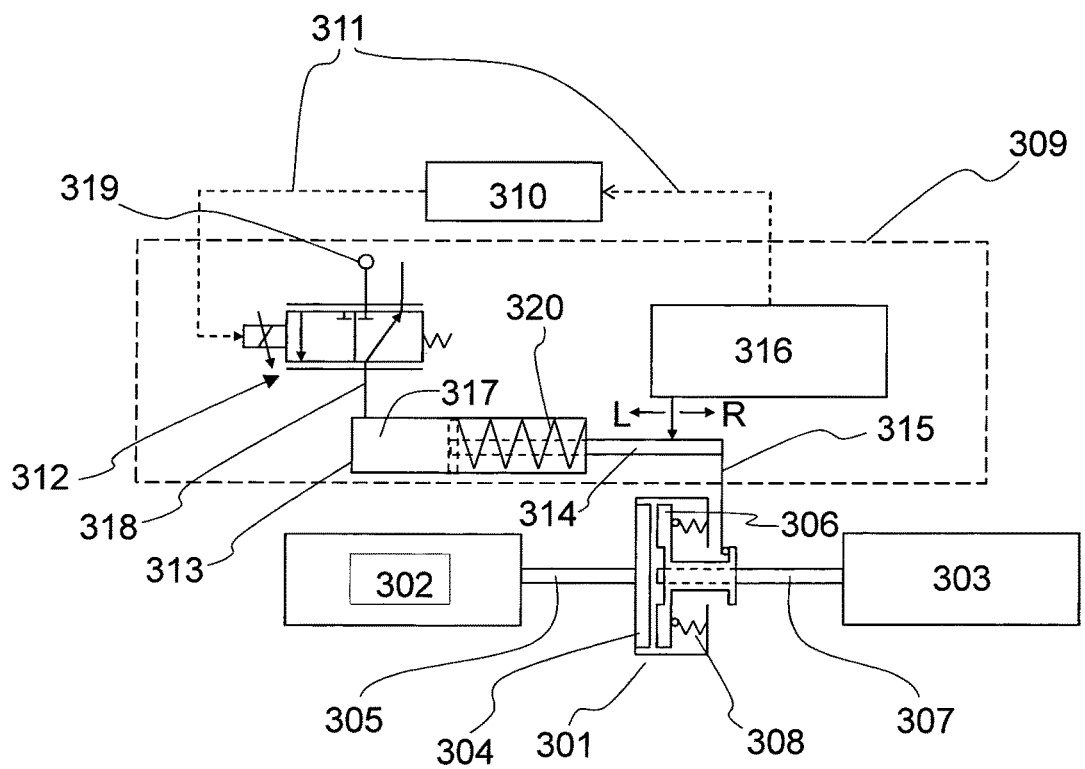
FIG. 3 shows a schematic layout of the clutch and the clutch actuating mechanism.

FIG. 3 shows a schematic layout of a preferred embodiment of the disclosure. The friction clutch 301 is situated between the engine 302 and the gear box 303. The friction clutch comprises a first clutch plate 304 which is fixedly mounted to a rotatable crankshaft 305 of the engine 302, and a second clutch plate 306 which is rotationally fixed but axially movable on a rotatable transmission input shaft 307 connected to the gear box 303. The clutch is here passively engaged by means of the pressure from at least one spring 308. The clutch may for example be engaged by means of a plurality of angular spaced apart coil springs, a diaphragm spring or another type of spring. The at least one spring 308 presses the second clutch plate 306 towards the first clutch plate 304. Unless a force is applied in the opposite direction, the at least one spring 308 will cause the second clutch plate 306 to abut against the first clutch plate 304, such that torque may be transmitted from one clutch plate to the other clutch plate through surface friction between the faces of the clutch plates.

The clutch 301 is actuated by a clutch actuating mechanism 309 which is connected to a clutch control unit 310 via signal cables 311. When the clutch is to be disengaged, the clutch control unit 310 sends a signal to a directional control valve 312. Upon receipt of the signal, the spool of the directional control valve 312 switches position from a normal position to a working position. In the normal position, air in a working chamber 317 of the clutch actuator is allowed to escape via a control line 318, the directional control valve 312, and subsequently out of the system. In the working position, compressed air from a compressed air source 319 is supplied to the piston side of the clutch actuator, thereby feeding compressed air into a single-acting cylinder serving as a clutch actuator 313. The compressed air presses against a piston rod 314, forcing the piston rod 314 to move in, as seen in FIG. 3, a rightward direction R.

A connection member 315 transfers the rightward motion from the piston rod 314 to the second clutch plate 306, and the second clutch plate 306 is consequently moved away from the first clutch plate 304. The result is that the clutch becomes partly or completely disengaged, the degree of disengagement depending on how far the second clutch plate 306 is moved away from the first clutch plate 304.

Correspondingly, when the clutch is to be engaged, the clutch control unit 310 commands the directional control valve 312 to release compressed air from the clutch actuator 313. As the pressure from the compressed air is reduced, the piston rod 314 is pressed back into the clutch actuator by an actuator internal spring 320 and/or the spring, 308 of the clutch, the piston rod 314 thus moving in leftward direction L.

Alternatively, a directional control valve being able to feed compressed air into both ends of a double-acting cylinder serving as clutch actuator 313 may be used. The internal spring 320 would in such case be superfluous, as the piston rod 314 would be forced in leftward direction L by feeding compressed air into the rightward end of the clutch actuator 313 cylinder while allowing air in the working chamber 317 escaping via the control line 318. In order to force the piston rod 314 in rightward direction R, compressed air is supplied to the working chamber 317 while allowing air to escape from the rightward end of the clutch actuator cylinder via an additional control line (not shown in the figure).

The position of the second clutch plate 306 along the axis of the transmission shaft 307 is monitored by means of a position sensor 316 that detects the position of the piston rod 314 of the clutch actuator 313 and feeds the information to the electronic control unit 310. The position of the piston rod 314 is directly linked to the position of the second clutch plate 306 since they are interconnected by a rigid connection member 315. The position sensor 316 is preferably, but not necessarily, a linear position sensor. Alternatively, the position sensor may monitor the position of the second clutch plate 306 directly, or the position of the connection member 315, thereby increasing the accuracy of the position detection of the second clutch plate 306.

The method of this disclosure concerns calibration of the control algorithm of the clutch control unit 310 in order to achieve improved timing of clutch 301 disengagement and engagement. Factors such as ageing, wear, individual characteristics of the components in the clutch system, pressure of the compressed air source 319, clutch component temperature and the rapidity of the control valve 312 may influence the timing of clutch 301 engagement and disengagement.

Figure 6:
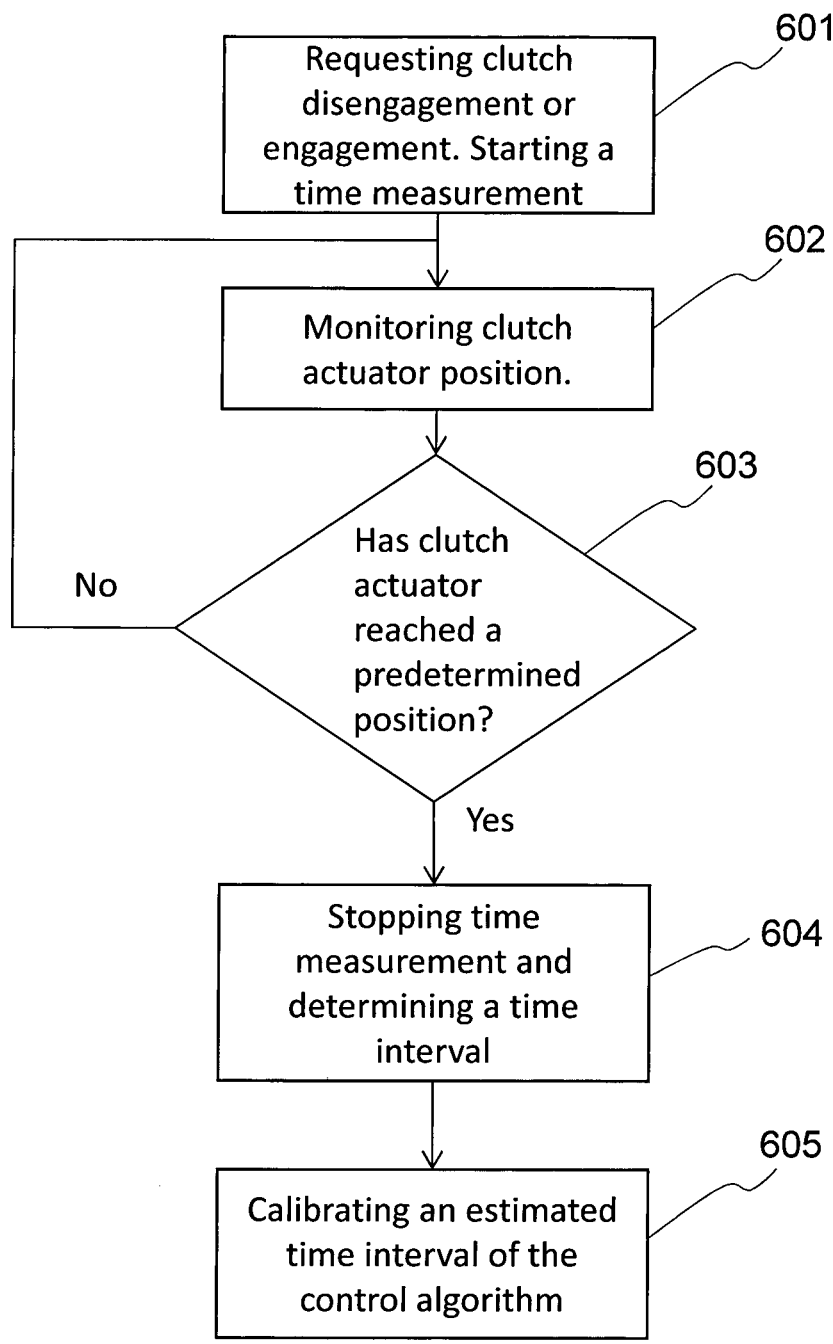
FIG. 6 shows a schematic flow chart for the disclosed method.

The method is schematically illustrated by a flow chart in FIG. 6. The first step 601 of the method involves requesting clutch disengagement or engagement by sending a corresponding control signal from the clutch control unit 310 to the clutch actuating mechanism 309. Simultaneously a time measurement is initiated. In a second step 602 the clutch actuator position is more or less continuously monitored by the position sensor 316 sending information to the clutch control unit 310. In the third step 603 the control unit evaluates whether the clutch actuator 313 has reached a predetermined position or not. Typically, the clutch disengagement point is selected as said predetermined position. The clutch control unit 310 determines that the clutch 301 has become disengaged when the position sensor 316 signals that the piston rod 314 of the clutch actuator 313 has reached the position that corresponds to the second clutch plate 306 reaching the clutch disengagement point, i.e. the position at which the clutch 301 becomes disengaged. The clutch disengagement point and engagement point respectively, as well as the corresponding, clutch actuator positions, are generally regularly determined by the clutch control. unit using any method well-known by the skilled person, such as disclosed in WO12083976 or WO0117815, and are therefore considered known to the control unit.

If it is determined that the clutch actuator 313 has not yet reached to the predetermined position the control unit continues polling the input signal from the position sensor 316. Upon determining that the clutch actuator has reached the predetermined position the method proceeds to a fourth step 604 of the method that involves stopping the time measurement and determining the resulting time interval. In a fifth step 605, the control algorithm of the clutch control unit 310 is then calibrated with the determined time interval, using it as an estimation of how far in advance a request for disengagement has to be made in order for the disengagement to take place at a desired point of time. Since the determined time interval reflects the actual time required from request to disengagement at prevailing clutch system conditions, the calibrated" clutch control unit 310 will be capable of correct timing of disengagement of the clutch 301, also in an aged and worn clutch system.

For improved timing of clutch engagement, the calibration is preferably carried out in a corresponding way; but instead determining the time interval from when a request for engagement is made by the clutch control unit 310 until the second clutch plate 306 reaches the position at which the clutch torque transmission capacity starts to increase during clutch engagement, i.e. at a clutch engagement point. The control algorithm of the clutch control unit 310 is then calibrated with this determined time interval, using it as an estimation of how far in advance a request for clutch engagement has to be made in order for the engagement to take place at a desired point of time.

In the examples above, the time interval used in the calibration has been defined to end when the clutch actuator 313 has reached the clutch engagement point and disengagement point respectively. However, the position of the clutch actuator 313 that defines the end point of the time interval could be any predetermined position of the clutch actuator 313, for example when a 5% torque transmission capacity is provided, or the like.

Figure 4:
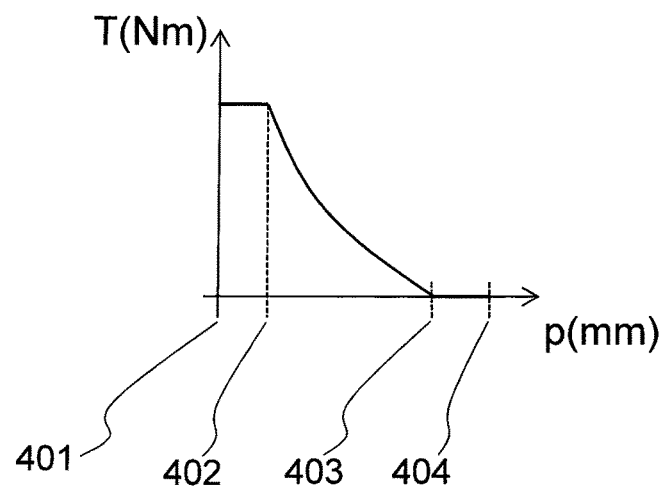
FIG. 4 shows a graph of the torque transmitting capability of the clutch as a function of the position of the piston rod of the clutch actuator.

FIG. 4 shows a graph of the torque T transmitting capability of the clutch as a function of the position p of the piston rod 314. At a first position 401 of the piston rod, the second clutch plate 306 completely abuts against the first clutch plate 304, and the clutch is thus fully engaged and at the maximum of its torque transmitting capability upon feeding the piston side of the clutch actuator 313 with compressed air, the piston rod 314 starts to move in a rightward direction R, away from the first position 410. Due to play between the piston rod 314 and the second clutch plate 306, the second clutch plate 306 initially remains unaffected by the displacement of the piston rod 314 and the maximum torque transmitting capability of the clutch is thus initially retained. This is indicated by the torque T curve being flat between the first position 401 and a second position 402 in the graph of FIG. 4. As the piston rod 314 reaches the second position 402, the effect of the play ceases and the second clutch plate 306 starts to follow the movement of the piston rod. As the second clutch plate 306 moves away from the first clutch plate 304, the torque transmitting capability decreases. At a third position 403 of the piston rod, the second clutch plate 306 has moved, sufficiently far away from the first clutch plate 304 as to completely disengage, and consequently the torque transmitting capability of the clutch is zero. The torque transmitting capability of the clutch remains zero as the piston rod 314 moves from the third position 403 to a fourth position 404 beyond which the piston rod 314 is not able to go. Even though the second clutch plate 306 follows the movement of the piston rod 314 beyond the third position 403, this does not affect the torque transmitting capability, since the clutch is already fully disengaged.

Figure 5A:
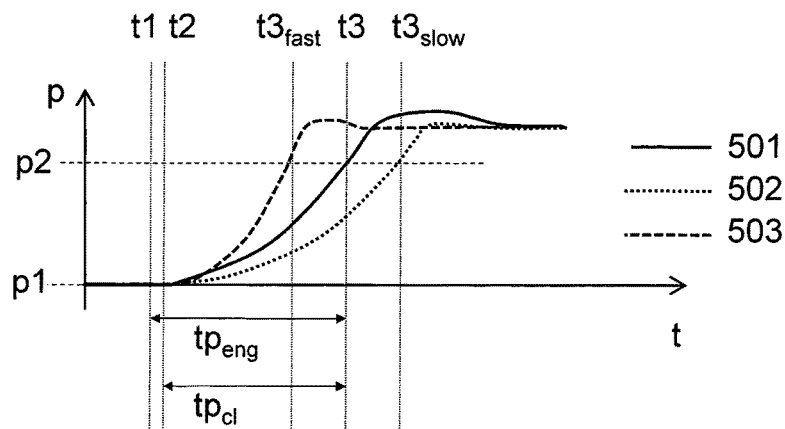
FIG. 5a shows a graph of the clutch position during a typical clutch disengagement process.

FIG. 5a shows a graph of the position of the second clutch plate 306 during a typical clutch disengagement process. At position p1, the second clutch plate 306 completely abuts against the first clutch plate 304, and the clutch is fully engaged. Position p1 corresponds to the first position 401 in FIG. 4. Position p2 is the clutch disengagement point, the position beyond which no torque can be transmitted between the clutch plates 304; 306. Position p2 corresponds to the third position 403 in FIG. 4. The solid line 501 in FIG. 5a represents the position of the second clutch plate 306 in a clutch system with characteristics that are correctly reflected in the control algorithm of the clutch control unit 310. Upon receiving instructions or self deciding to initiate a gear shifting sequence a control unit, such as the clutch control unit 310 and/or the engine control unit 108 calculates the timing for performing the gear shifting sequence, whereby the timing includes the time point for generating engine torque ramp down instruction and time point for generating clutch disengagement instruction. The timing is calculated taking into account the estimated time period $tp_{eng}$, from sending the instruction until engine output torque actually reaches zero and the estimated time period $tp_{e}i$ from sending the instruction until the clutch disengagement point is reached, respectively.

In the example of FIG. 5A-5E, the clutch disengagement is targeted to occur at time point t3. As a result, based on the estimated time period $tp_{eng}$ engine ramp down is initiated at time t1, and based on the estimated time period $tp_{e}i$ clutch disengagement is initiated at time t2, in order to accomplish jerk-free disengagement at time t3. In this example, the engine ramp down is initiated before the clutch disengagement request, but it could also be the other way around, depending on which of the two processes (engine ramp down or clutch disengagement) that requires the largest amount of time. A clutch system correctly estimated by the control unit reaches disengagement—that is position p2—at time t3, as illustrated with the solid line 501. However, if the clutch control unit 31 0 is not correctly calibrated, and the clutch system is slower than estimated by the clutch control unit 31 0, disengagement will be reached at a later time point $t3_{s}i_0w$ than desired, as illustrated with the dotted line 502. If the clutch system on the other hand is faster than estimated by the clutch control unit 31 0, disengagement will be reached already at time point t3fast, as illustrated by the dashed line 503.

Figure 5B:
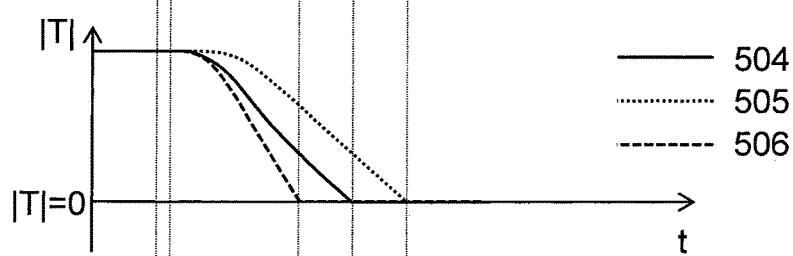
FIG. 5b shows a graph of the clutch torque transmitting capacity during a typical clutch disengagement process.

FIG. 5b shows a graph of the absolute torque transmitting capacity of three different clutches during a typical clutch disengagement process. The solid line 504 represents a correct clutch with respect to the clutch control algorithm, the dotted line 505 represents a slow clutch, and the dashed line 506 a fast clutch. At the time t2 of disengagement request, all three clutches are at their maximum torque transmitting capacity. The correct clutch reaches its zero torque transmitting capacity (i.e. disengagement) at the desired time t3. However, the fast clutch reaches its zero torque transmitting capacity already at $t3_{fas}t$, and the slow clutch not until at $t3_{s}i_0w$–

Figure 5C:
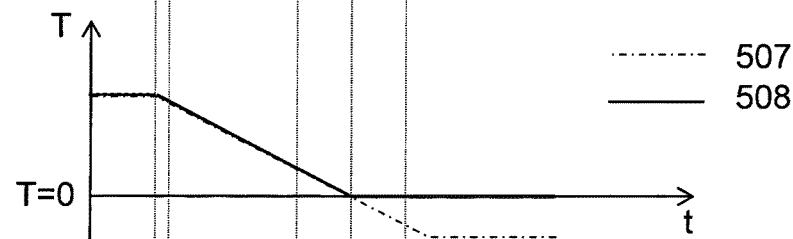
FIG. 5c shows a graph of the torque transmitted by a correct clutch during a typical clutch disengagement process.

In FIG. 5c, the dotted-dashed line 507 represents the engine torque during the engine torque ramp down which is simultaneous to the clutch disengagement in a gear shifting process (see FIG. 2). The engine torque ramp down starts at time t1, and at time t3 the engine torque passes zero before going negative due to the engine's internal resistance (i.e. engine braking). The solid line 508 represents the torque transmitted by a correctly timed clutch during the clutch disengagement process. The correct clutch reaches the clutch disengagement point, where it no longer can transmit torque, at time t3, which is exactly the same time as the engine torque also reaches zero. This exact match results in a smoothly transmitted torque throughout the clutch disengagement process, which in turn ensures the driving comfort.

Figure 5D:
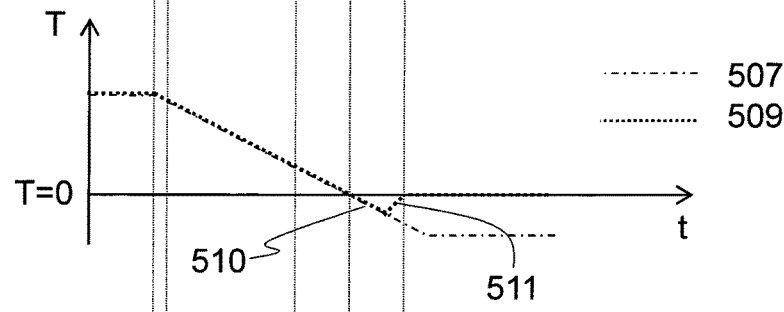
FIG. 5d shows a graph of the torque transmitted by a slow clutch during a typical clutch disengagement process.

In FIG. 5d the dotted line 509 shows the torque transmitted when the clutch is slower than estimated by the control unit. The dotted-dashed line 507 still represents the engine torque during ramp down. Here, the slow clutch has not yet reached disengagement when the engine torque passes zero at time t3. Hence, the slow clutch will still be capable to transmit torque after time t3, which results in negative torque 510 being transferred to the transmission shaft 307 during a short period of time. Transmitting a negative torque to the transmission is equal to engine braking and hence the vehicle will perform an undesired deceleration, which by the driver and passengers often is perceived as an unpleasant jerk A little later, the magnitude of the negative engine torque begins to exceed the torque transmitting capacity of the slow clutch, and the clutch slips 51 1 before reaching zero torque transmitting capacity at $t3_{slow-}$ In FIG. 5e, the dashed line 512 shows the torque transmitted when the clutch is faster than estimated by the control unit. The dotted-dashed line 507 still represents the engine torque during ramp down. The fast reduction in torque transmitting capability of the fast clutch leads to the torque transmitting capability falling below the magnitude of the engine torque after a while. At that time, the clutch starts slipping 51 3. The slipping goes on until time t3 fast when the fast clutch reaches its disengagement point. Clutch slipping and the fact that the clutch disengagement point is reached before engine output torque has decreased to zero will result in a certain engine speed increase that may be perceived as uncomfortable by a driver. The sudden decrease in vehicle acceleration may also be negatively perceived by a drier, and clutch slipping will lead to increased wear of the clutch.

Figure 5E:
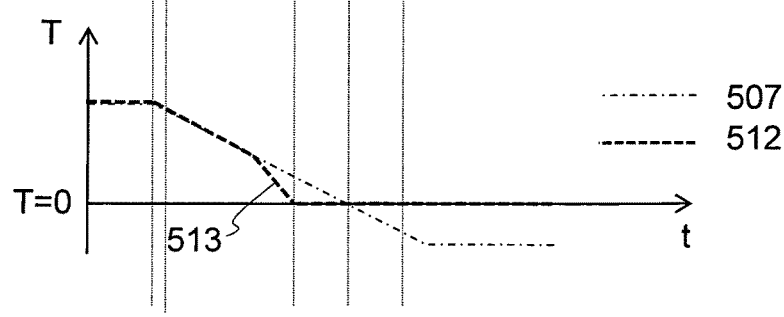
FIG. 5e shows a graph of the torque transmitted by a fast clutch during a typical clutch disengagement process.

As described in connection to FIGS. 5d-5e, improperly timed clutch negatively effects the driving comfort, but with the calibration procedure of the disclosed method, the clutch control algorithm may be adapted to clutch system to both slower and faster clutch characteristics, compensating by either an earlier or later directional control valve 312 activation in order to achieve proper timing of clutch disengagement/engagement.

The method for calibrating the clutch control algorithm has been disclosed in the context of an automatic clutch between an engine and a transmission in a vehicle, but the method is equally applicable to many other applications in vehicles and other machinery.

Reference signs mentioned in the claims should not be seen as limiting the extent of the matter protected by the claims, and their sole function is to make claims easier to understand.

As will be realised, the disclosure is capable of modification in various obvious respects, all without departing from the scope of the appended claims. Accordingly, the drawings and the description thereto are to be regarded as illustrative in nature, and not restrictive.

The invention claimed is:

1. Method for calibrating a control algorithm of a clutch control unit of a vehicle, the method comprising
   requesting clutch engagement;
   monitoring clutch actuator position;
   determining a time interval that starts with the clutch engagement request and ends when the clutch actuator has reached a predetermined position, wherein the predetermined position corresponds to a position where the clutch torque transmission capacity starts to increase during clutch engagement; and
   calibrating an estimated time interval of the control algorithm starting with clutch engagement request and ending when the clutch actuator has reached the predetermined position based on the determined time interval.

2. Method according to claim 1, wherein the predetermined position corresponds to a predetermined clutch torque transmission capacity.

3. Method according to claim 1, comprising determining the time interval at vehicle standstill.

4. Method according to claim 1, wherein the monitored clutch engagement is executed at its currently maximal possible speed.

5. Method according to claim 1, comprising determining the time interval during driving of the vehicle.

6. Method according to claim 1, comprising collecting a plurality of determined time intervals, calculating an average time interval based on the plurality of determined time intervals, and calibrating the clutch control unit based on the calculated average time interval.

7. Method according to claim 1, wherein the clutch actuator is located at a completely disengaged position at time of the clutch engagement request.

8. Method according to claim 1, wherein the clutch is arranged between a propulsion unit and a gear box of the vehicle.

9. Method according to claim 1, wherein the vehicle comprises an automated friction clutch arrangement having a friction clutch, a clutch actuating mechanism and a clutch control unit, wherein the clutch is disengaged and engaged by the clutch actuating mechanism.

10. Method according to claim 9, wherein the clutch actuating mechanism is powered by pressurised gas supplied from a gas storage tank, and wherein the estimated time interval of the control algorithm is calibrated based also on current gas pressure within the gas storage tank.

11. Method according to claim 9, wherein the clutch actuating mechanism is electrically powered, and wherein the estimated time interval of the control algorithm is calibrated based also on current voltage supplied to the clutch actuating mechanism.

12. Method according to claim 1, wherein the estimated time interval of the control algorithm is calibrated based also on current temperature of at least one of the clutch components.

13. Method according to claim 1, wherein the clutch actuating mechanism comprises a directional control valve.

14. Method according to claim 1, wherein the friction clutch is passively engaged by spring pressure.

15. Method according to claim 1, wherein the clutch actuator position is determined by means of a position sensor.

16. A computer comprising program code for performing all the steps of claim 1 when the program is run on the computer.

17. A computer program product comprising program code stored on a non-transitory computer readable medium for performing all the steps of claim 1 when the program product is run on a computer.

18. A computer system for implementing a method for calibrating a control algorithm of a clutch control unit of a vehicle, the method comprising
  requesting clutch engagement;
  monitoring clutch actuator position;
  determining a time interval that starts with the clutch engagement request and ends when the clutch actuator has reached a predetermined position, wherein the predetermined position corresponds to a position where the clutch torque transmission capacity starts to increase during clutch engagement; and
  calibrating an estimated time interval of the control algorithm starting with clutch engagement request and ending when the clutch actuator has reached the predetermined position based on the determined time interval.

19. Vehicle comprising a clutch and a clutch control unit, characterised in that a control algorithm of the clutch control unit is arranged to be calibrated by
  requesting clutch engagement;
  monitoring clutch actuator position;
  determining a time interval that starts with the clutch engagement request and ends when the clutch actuator has reached a predetermined position, wherein the predetermined position corresponds to a position where the clutch torque transmission capacity starts to increase during clutch engagement; and
  calibrating an estimated time interval of the control algorithm starting with clutch engagement request and ending when the clutch actuator has reached the predetermined position based on the determined time interval.

* * * * *